Dec. 10, 1935.  C. H. WHITE  2,023,655
PLANTER
Filed March 28, 1930
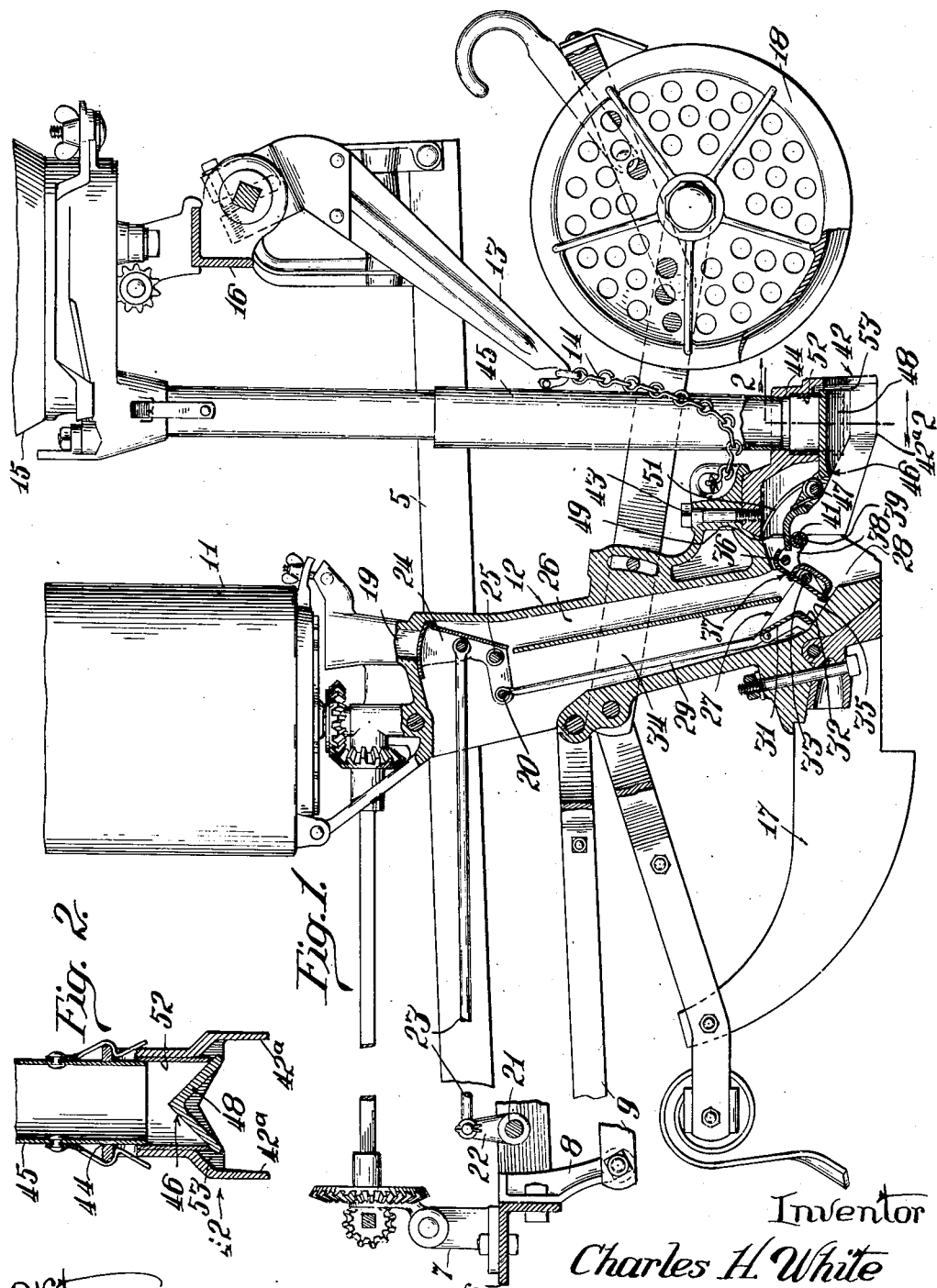
Inventor
Charles H. White
By Brown, Jackson, Boettcher & Drenner
Attorneys.
Witness
Milton Lenoir Patented Dec. 10, 1935

2,023,655

UNITED STATES PATENT OFFICE 2,023,655

PLANTER

Charles H. White, Moline, Ill., assignor to Deere & Company, Moline, Ill., a corporation of Illinois Application March 28, 1930, Serial No. 439,567

32 Claims. (Cl. 111—80)

The present invention relates to planting implements designed for check row planting and has particular reference to the combination of a fertilizer attachment with the corn planting mechanism in which the fertilizer valve is operated through the operation of the lower seed valve of the planting mechanism.

Heretofore, in planters equipped with a fertilizer attachment it has been customary to provide separate link mechanism having an independent connection with the rock shaft of the planter by which the seed feeding and distributing valves are operated, which, of course, added considerable weight to the parts operated by the check fork. This is objectionable because of the fact that the more weight added to the parts operated by the check fork the more the check wire will tend to stretch during the passage of the planter across the field, which gives rise to errors in the cross checking of the rows. That is to say, because of this stretch, accurately spaced hills transversely of the rows cannot be obtained, particularly at the ends of the rows, making it difficult to cultivate the field in two directions, especially where cultivation is to be done by a multiple row tractor cultivator, because of the higher cultivating speed and the difficulty of dodging offset plants in the different rows. This objectionable stretching of the wire is fully discussed in my prior Patent No. 1,951,458, issued March 20, 1934, and, therefore, need not be further referred to herein as reference may be had to that application if desired.

It is also important in the operation of a fertilizer attachment with a check-row corn planter that the fertilizer valve be operated in as accurately timed relation with respect to the seed valve of the planter as possible, which has been difficult to obtain, and particularly maintain, in the old arrangement owing to the number of different pivotal connections in the train of operating parts to the fertilizer valve, and the likelihood of play and wear in these connections.

It is one of the objects of my invention, therefore, to provide a check row planter of the type equipped with fertilizer distributing mechanism so constructed and arranged that the abovementioned defects are obviated.

Another object of the invention is to so reduce the weight and inertia of the fertilizer distributing mechanism that the resistance offered by its operation is considerably reduced, thereby reducing the force required to operate the parts and hence the force acting to objectionably stretch the wire as pointed out above.

A further object of the invention is to provide means for operating the fertilizer valve from the lower seed valve of the planting mechanism, thus avoiding the use of the separate link mechanism heretofore employed for operating the fertilizer valve from the rock shaft of the planter which is rocked by the check fork, and thereby lessening the inertia of the mechanism operated by said check fork.

A still further object of the invention is to provide means whereby the operation of the fertilizer valve and the lower seed valve may be more accurately timed with respect to each other.

A still further object of the invention is to provide a fertilizer valve in the form of a wedge shaped deflecting member for properly distributing the fertilizer.

Further objects and advantageous features will be apparent from the following description of my invention taken in connection with the preferred embodiment thereof illustrated in the accompanying drawing, in which Figure 1 is a fragmentary sectional view showing parts of a check row planter, and a portion of the seed dropping mechanism and fertilizer dropping mechanism in detail, and Figure 2 is a sectional view taken on the plane of the line 2—2 of Figure 1, and illustrating the wedge-shaped fertilizer valve in closed position abutting against the sharp edged rectangular sleeve positioned below the fertilizer tube.

Referring to Figure 1 of the drawing, the frame of the planter is indicated by the reference numeral 5, and inasmuch as this type of planter is old and well known in the art I have not deemed it necessary to completely illustrate the same herein. It will suffice to say that the frame 5 includes a cross member 6 carrying brackets 7 and 8 which respectively support a part of the driving mechanism for the seed feeding device, and the forward end of a link 9 forming a part of the means for pivotally carrying the seed hopper 11, runner shank 12, and associated structure, the latter parts being adapted to be raised to transport position by any conventional lifting arm arrangement, indicated by the numerals 13, 14. A fertilizer hopper 15 is suitably supported on a cross member 16 of the frame in rear of the seed hopper 11, as shown. Carried by and extending forwardly from the runner shank 12 is a runner or furrow opener 17, and a covering wheel 18 is carried by said runner shank rearwardly thereof, which may also serve as a gage wheel.

As is usual in devices of this type, a seed feeding device is provided in the lower end of the seed hopper 11 adapted to drop a predetermined number of seeds into a seed chamber 19 according to the actuation of a seed feeding plate forming a part of the seed feeding device, but as these parts have nothing to do with the present invention they have not been illustrated.

In the operation as a check row planter, buttons on a wire stretched across the field are adapted to actuate mechanism including a rock shaft 21 which turns an arm 22 secured thereto, thereby actuating a rod 23. The rod 23 is operatively connected to an upper valve member 24 pivoted at 25 to the runner shank, and serves as the means for directly connecting the valve member 24 with the checking mechanism in which the shaft 21 is a part, a pull on the rod 23 opening the valve 24, as will be readily understood.

The upper valve member 24 is adapted to close the lower end of the seed chamber 19, but when rocked by a pull of the rod or link 23 is adapted to clear the opening of the chamber 19 and allow the accumulation of seeds therein to fall by gravity down a passage 26 formed in the runner shank 12 where the seeds are received by a lower valve member 27, by the operation of which they are subsequently discharged through an opening 28 in the lower end of the runner shank into the furrow.

Pivotally connected to the upper valve member 24 at 20 is a rod member 29 constituting a part of the lower valve member 27. The construction of this member 29 is fully illustrated and described in my prior Patent No. 1,951,458, issued March 20, 1934, and, therefore, need not be specifically described herein. It will suffice to say here that the member 29 is provided at its lower end with a rearwardly bent portion 31 and a part bent approximately at a right angle thereto to form the ejector face 32. The side walls or wings of the lower valve member 27 have rearwardly extending portions carrying a pin 33, for a purpose to be hereinafter described.

The runner shank 12 is provided with a passageway 34 receiving the lower valve member 27 and its extension rod 29 which passage is provided with a rearwardly and downwardly inclined surface 35 which forms a support on which the lower valve member 27 slides.

Pivoted to the lower end of the runner shank 12, as by a transverse bolt 36, is a lower seed gate 37. This seed gate is formed of sheet metal, and comprises side walls having elongated slots therein serving to receive the pin 33 carried by the side walls of the lower valve member 27, all as fully shown and described in my prior Patent No. 1,951,458, issued March 20, 1934, above mentioned. The seed gate 37 is provided with two rearwardly extending arms 38 between which is mounted a pin 39 carrying an anti-friction roller 41, the purpose of which will be hereinafter described.

The fertilizer attachment comprises a valve boot 42 which is secured to the runner shank or planter valve housing 12 by means of a bolt 43. The upper side of the boot 42 is provided with an opening 44 for receiving a fertilizer tube 45 extending downwardly from the fertilizer hopper 15 and through which the fertilizer is fed from said hopper. A fertilizer valve 46 is pivotally mounted on a pin 47 supported in trunnions provided in the opposite side walls of the boot 42. The valve 46 comprises a rearwardly extending wedge-shaped portion 48 and a forwardly extending arm or actuating member 49 which extends over the roller 41, above described, and is normally in contact therewith. The wedge-shaped fertilizer valve portion 48, as best shown in Figure 2, is formed with downwardly and laterally outwardly inclined plate sections presenting outwardly sloping wall surfaces facing upwardly and connected together at their adjacent portions to form a fore and aft extending edge, whereby the fertilizer stream is divided. Motion is transmitted directly from the seed gate 37 to the fertilizer valve 46 through the pin 39 and arm 49, and by providing the antifriction roller 41 between these parts the friction of actuation is reduced to a minimum.

A spring 51 having one end bearing against the inner wall of the upper side of the boot 42, its intermediate portion embracing the pin 47, and its other end bearing against the upper surface of the arm 49, tends to maintain the valve 48 in its closed position, as will be readily understood. The arm 49 has a balancing influence on the valve portion 48 so that only a light spring pressure is needed.

A short rectangular sleeve 52 is fitted into the lower end of the opening 44 in the boot 42 which opening is correspondingly rectangularly shaped to receive said sleeve. This sleeve projects down a short distance into a cavity 53 formed in the boot 42. The sleeve 52 is provided with a sharp lower edge (Fig. 2) against which the wedge-shaped member 48 of the valve 46 bears when in closed position, and the front and rear walls of said sleeve are suitably notched to correspond with the pitch of the two sides of the wedge-shaped valve member 48.

The lower portion of the boot 42 comprises spaced side walls or wings 42a which serve to widen the upper portion of the furrow cut by the runner 17. The front end of said boot is approximately the same width as the rear end of the runner, and the front portions of the side walls 42a diverge outwardly so as to spread the sides of the furrow apart, while the rear portions of said side walls extend substantially in parallelism, as shown in Fig. 2. The side walls 42a—42a run at a somewhat shallower depth than the runner 17, and only function to widen the upper portion of the furrow, above the plane of the seed which has been dropped therein by the planting mechanism. These side walls are so formed, however, that they cut slices of soil from the side walls of the relatively narrow seed furrow, in the act of widening the latter, and to turn these slices of soil inwardly over the seed so that the seed will be covered with a layer of soil before the fertilizer is dropped into the furrow. The side wall construction of this boot 42 is similar to and operates in the same way as that shown in my prior Patent No. 1,906,351, issued May 2, 1933, so that it is deemed unnecessary to more particularly illustrate or describe the same herein.

In the operation of my improved fertilizer attachment, each time the check fork operates to open the upper valve 24 of the seed dropping device the member 29 is moved downwardly, sliding the lower valve member 27 of the seed dropping device downwardly and rearwardly along the inclined surface 35, which movement serves to swing the lower seed gate or member 37 in a counterclockwise direction, and the roller 41 bearing against the under side of the arm 49 of the fertilizer valve rotates said valve in a clockwise direction causing the member 48 of the valve to move downwardly from the lower edges of the rectangular sleeve 52, permitting the fertilizer in the tube to pass through the opening down into the seed bed.

As above described, the seed in the seed bed has been covered by a layer of soil by the side walls of the boot 42, and, therefore, the fertilizer dropped into the furrow upon the opening of the valve will not come into contact with the seed. Owing to the wedge-shaped formation of the fertilizer valve concentrated quantities of fertilizer will be deposited above the planted depth of the seed along opposite sides of the furrow and a thin stratum of fertilizer will be deposited on the layer of earth above the seed, all of which is fully explained in my above mentioned prior patent.

By virtue of the direct transmission of operating energy from the seed valve or gate 37 to the fertilizer valve 46 the number of parts actuated by the check fork is materially reduced, and consequently there is a marked reduction in the inertia and friction which opposes the actuation of the check fork and which tends to stretch the check wire.

Moreover, the reduction of the number of pivots and other working joints reduces the amount of wear and play which can arise in the mechanism. All of this is of decided importance in obtaining accurate cross checking between the rows.

I claim:—

1. In a planter, the combination of a seed feeding device comprising a valve, means for opening and closing said valve, a fertilizer valve, and means on said seed feeding valve separate from and unconnected with said fertilizer valve and effective upon the opening of said seed feeding valve for moving said fertilizer valve into open position.

2. In a planter, the combination of a seed feeding device comprising upper and lower valves, a roller on said lower valve, fertilizer distributing means comprising a fertilizer valve, means on said fertilizer valve operated by said roller for opening said fertilizer valve upon the opening of said lower valve, and spring means for closing said fertilizer valve upon the closing of said lower valve.

3. In a planter, the combination of a valve comprising a pivotally mounted seed gate, fertilizer distributing means comprising a fertilizer valve, and roller means on said seed gate contacting with a portion of said fertilizer valve for opening said fertilizer valve upon opening movement of said seed gate.

4. In a planter, the combination of a valve comprising a sliding member and a seed gate slidably and pivotally connected therewith, fertilizer distributing means comprising a pivotally mounted fertilizer valve, means on said seed gate cooperating with said fertilizer valve for opening said fertilizer valve upon opening movement of said seed gate, and means for closing said fertilizer valve upon the closing of said seed gate.

5. In a planter, the combination of a housing, a seed valve mounted in said housing, means for opening said valve, a wedge-shaped fertilizer valve pivotally mounted in said housing, and means on said seed valve separate from and cooperating with said fertilizer valve for opening said fertilizer valve upon the opening of said seed valve.

6. In a planter, the combination of a housing, a seed valve mounted in said housing, means for opening said valve, a wedge-shaped fertilizer valve pivotally mounted in said housing, spring means in said housing for holding said fertilizer valve normally closed, and means on said seed valve cooperating with said fertilizer valve whereby said fertilizer valve is opened against the action of said spring upon the opening of said seed valve.

7. In a planter, the combination of a housing, a seed valve in said housing, means for operating said valve, a fertilizer attachment comprising a boot associated with said housing, a fertilizer valve comprising a wedge-shaped plate pivotally mounted in said boot, a wedge-shaped seat in said boot and against which said plate abuts when in closed position for controlling the discharge of fertilizer, and means mounted on said seed valve adapted to operate said fertilizer valve.

8. In a planter, the combination of a housing, a pivotally mounted seed valve in said housing, said valve comprising a rearwardly extending arm adapted to move upwardly in the opening of said valve, means for opening said valve, and a pivotally mounted fertilizer valve comprising a wedge-shaped valve portion and an arm extending forwardly therefrom, said forwardly extending arm adapted to be moved upwardly by the rearwardly extending arm of said seed valve to open said fertilizer valve upon the opening of said seed valve.

9. In a planter, the combination of a housing, a seed valve in said housing, said valve comprising a pivotally mounted rearwardly extending arm adapted to move upwardly in the opening of said valve, means for opening said valve, a pivotally mounted fertilizer valve comprising a forwardly extending arm and a wedge-shaped valve portion extending rearwardly therefrom, and an antifriction roller mounted on one of said arms for transmitting movement therebetween for moving said forwardly extending arm upwardly to open said fertilizer valve upon the opening of said seed valve.

10. In a planter, the combination of a valve comprising a pivotally mounted seed gate, a pair of arms extending rearwardly from said seed gate, a roller mounted between said arms, a fertilizer valve, and means on said fertilizer valve cooperating with said roller for opening said fertilizer valve upon opening movement of said seed gate.

11. In a planter, the combination of a housing, a seed valve in said housing, means for operating said valve, a fertilizer attachment comprising a boot connected with said housing, a fertilizer valve comprising a wedge-shaped plate pivotally mounted in said boot, a rectangular sleeve mounted in said housing and against which said plate abuts when in closed position, wedge-shaped notches in said sleeve corresponding with said wedge-shaped plate to form a valve seat therefor, and means mounted on said seed valve adapted to operate said fertilizer valve.

12. In a planter, the combination of a seed feeding device comprising a valve, means for opening and closing said valve, a pivotally mounted fertilizer valve comprising a wedge-shaped plate, a spring for normally holding said fertilizer valve in closed position, a roller mounted on said seed valve, and means on said fertilizer valve cooperating with said roller whereby upon the opening of said seed valve said fertilizer valve is opened against the action of said spring.

13. In a check-row planter, the combination of a seed feeding device, a furrow opener, means extending from said feeding device to said furrow opener, said means providing an open bottom chamber and having a passage extending downwardly from said chamber and having a seed discharge opening, a valve controlling the opening in said chamber, a second valve controlling said seed discharge opening, said valves being formed of sheet metal whereby their inertia is decreased and the drag on the check wire reduced, a fertilizer boot connected with said furrow opener, a fertilizer valve in said boot, and means on said second valve separate from said fertilizer valve and effective on the opening of said second valve for opening said fertilizer valve.

14. In a check-row planter, the combination of a seed feeding device, a furrow opener, means extending from said feeding device to said furrow opener, said means provided with a chamber having an opening in the bottom thereof and adapted to receive seed from said device, said means having also a passage leading from said opening to a seed discharge opening adjacent the furrow opener, valve means controlling said chamber opening, a second valve means connected to the first valve means and adapted to control said seed discharge opening, said second valve means including a member formed of sheet metal and having at the bottom thereof a pair of upwardly extending sides and a sloping bottom with a downwardly extending seed ejecting face, a sheet metal gate member pivoted to said first mentioned means and adapted to cooperate with said second valve means, a fertilizer valve pivotally mounted in said first-mentioned means, and means on said gate member adapted to actuate said fertilizer valve directly whereby the inertia is decreased, the drag on the check wire reduced and the opening of said fertilizer valve relative to the opening of said second valve means is accurately timed.

15. In a check-row planter, the combination of a seed feeding device, a furrow opener, means extending from said feeding device to said furrow opener, said means provided with a chamber having an opening in the bottom thereof and adapted to receive seed from said device, said means also having a passage leading from said opening to a seed discharge opening adjacent the furrow opener, valve means controlling said chamber opening, a second valve means connected to the first valve means and adapted to control said seed discharge opening, said second valve means including a member formed of sheet metal and having at the bottom thereof a pair of upwardly extending sides and a sloping bottom with a downwardly extending seed ejecting face, a sheet metal gate member pivoted to said first-mentioned means and adapted to cooperate with said second valve means, a pair of rearwardly extending arms on said gate member, a roller mounted between said arms, and a fertilizer valve pivotally mounted in said first-mentioned means, and having an arm extending therefrom, said roller being operable to open said fertilizer valve by engagement directly with said arm whereby the inertia is decreased, the drag on the check wire reduced and the opening of said fertilizer valve relative to said second valve means is accurately timed.

16. In an implement of the class described, the combination of fertilizer distributing means comprising a discharge duct having a valve opening at its lower end, and a pivotally mounted valve adapted to swing into and out of seating engagement against said opening for controlling the discharge of fertilizer, said valve comprising a wedge shaped upper surface, the meeting edge of which extends fore and aft of the implement, for distributing the fertilizer laterally in the seed bed.

17. In a planter, the combination of a seed feeding device comprising a seed valve, a fertilizer valve, and means on said seed valve movable into contact with said fertilizer valve for opening said fertilizer valve upon opening movement of said seed valve, said means adapted to be movable out of contact with said fertilizer valve upon closing movement of said seed valve when the fertilizer valve remains open, whereby said seed valve closes irrespective of the closing of said fertilizer valve.

18. In a planter, the combination of a housing, a seed feeding valve mounted in said housing, means for opening said valve, a fertilizer conduit, a fertilizer valve controlling the movement of fertilizer through the conduit, and means on said seed valve movable into contact with said fertilizer valve for opening said fertilizer valve upon opening movement of said seed valve, said means adapted to be movable out of contact with said fertilizer valve upon closing movement of said seed valve, whereby such closing movement effects no movement of said fertilizer valve, and spring means for closing said fertilizer valve.

19. In an implement of the class described, the combination of fertilizer distributing means comprising a discharge duct having a valve opening at its lower end, and a valve intermittently operated during the operation of the implement and adapted to move into and out of seating engagement against said opening for controlling the discharge of fertilizer, said valve comprising a wedge shaped member disposed under said opening and having opposite laterally sloping walls for distributing the fertilizer in the seed bed in two separate laterally spaced streams.

20. In an implement of the class described, the combination of fertilizer distributing means comprising a rectangular discharge duct having a valve opening at its lower end, and a fertilizer valve comprising a wedge-shaped plate pivotally mounted in said rectangular discharge duct and adapted to move into and out of seating engagement against said opening for controlling the discharge of fertilizer.

21. In an implement of the class described, the combination of fertilizer distributing means comprising a fertilizer valve having a wedge-shaped plate pivotally mounted in said boot, a rectangular sleeve connected with said boot and against which said plate abuts when in closed position, and wedge-shaped notches in said sleeve corresponding with said wedge-shaped plate to form a valve seat therefor.

22. In an implement of the class described, the combination of fertilizer distributing means comprising a rectangular discharge duct having a valve opening at its lower end, a fertilizer valve having a wedge-shaped plate pivotally mounted in said discharge duct, a pivot pin for said valve, said valve being adapted to move into and out of seating engagement against said opening for controlling the discharge of fertilizer, and a coil spring encircling said pivot pin and biased to swing the valve to one position.

23. In a planter, the combination of a valve comprising a pivotally mounted seed gate, fertilizer distributing means comprising mechanism adapted to be opened and closed and including a movably mounted arm for actuating the same, and roller means on said seed gate contacting with said arm for opening said fertilizer distributing means upon opening movement of said seed gate.

24. In a planter, the combination of a housing, a pivotally mounted seed valve in said housing, means for opening said valve, said valve comprising a rearwardly extending arm adapted to move upwardly in the opening of said valve, fertilizer valve mechanism including sections having their upper portions contiguous and their lower portions spaced laterally, said plate sections being shiftable to a position to distribute the fertilizer in two laterally spaced streams, and means including a movable arm for actuating said plate sections, said movable arm being actuated by the rearwardly extending arm of said seed valve to open said fertilizer valve means upon the opening of said seed valve.

25. In an implement of the class described, the combination of fertilizer distributing means comprising a discharge duct having a valve opening at its lower end, and pivotally mounted valve means adapted to swing into and out of seating engagement against said opening for controlling the discharge of fertilizer, said valve means comprising, when open, angularly disposed upwardly facing surfaces arranged in wedge relation, the meeting edge of the surfaces extending fore and aft of the implement for distributing the fertilizer laterally in the seed bed.

26. In a planter, the combination of a seed feeding valve, fertilizer valve means, means on said seed feeding valve for moving the fertilizer valve means in one direction only for opening the latter upon opening movement of said seed valve, and separate means for closing said fertilizer valve means, whereby said seed feeding valve may close irrespective of the closing of said fertilizer valve means.

27. In an implement of the class described, the combination of fertilizer distributing means comprising a discharge duct having a valve opening at its lower end, and valve means for controlling the discharge of the fertilizer through said opening, said valve means comprising a swinging member having two walls seating against the opposite halves of said opening and adapted to be swung downwardly to present a wedge-shaped structure below the opening to distribute the fertilizer in two laterally spaced streams in the seed bed.

28. In an implement of the class described, the combination of fertilizer distributing means comprising a discharge duct having a valve opening at its lower end, the lower walls of said duct each having a V-shaped notch, and valve means for controlling the discharge of fertilizer through said opening comprising two downwardly and outwardly sloping walls adapted to seat against the sloping sides of said V-shaped notches to close said valve opening, and means for actuating said valve means to move said walls out of seating engagement with said opening, said walls thereupon functioning to distribute the fertilizer in two laterally spaced streams in the seed bed.

29. In an implement of the class described, the combination of fertilizer distributing means comprising a discharge duct having a valve opening at its lower end having straight edges along the sides and a V-shaped notch at each end, and valve means for controlling the discharge of fertilizer through said opening comprising two downwardly and outwardly sloping walls, the lower edges of which are adapted to seat against said longitudinal edges of the opening and the ends of which are adapted to seat against the sloping sides of said V-shaped notches to close said valve opening, and means for actuating said valve means to swing said walls out of seating engagement with the sides and ends of said opening, said walls thereupon functioning to distribute the fertilizer in two laterally spaced streams in the seed bed.

30. In a planter, the combination of a housing, a seed valve mounted in said housing, means for opening said valve, a fertilizer valve boot secured to said housing, a substantially rectangular fertilizer discharge duct mounted in said boot and having a valve opening at its lower end having straight edges along the sides and a V-shaped notch at each end, valve means for controlling the discharge of fertilizer through said opening comprising two downwardly and outwardly sloping walls, the lower edges of which are adapted to seat against said longitudinal edges of the opening and the ends of which are adapted to seat against the sloping sides of said V-shaped notches to close said valve opening, and means for actuating said valve means from said seed valve to swing said walls out of seating engagement with the sides and ends of said opening, said walls thereupon functioning to distribute the fertilizer in two laterally spaced streams in the seed bed.

31. In an implement of the class described, the combination of fertilizer distributing means comprising a discharge duct having a valve opening at its lower end, and valve means for controlling the discharge of fertilizer through said opening, said valve means comprising a movable member having two laterally spaced oppositely sloping walls seating against the opposite halves of said opening and adapted to be moved downwardly to present a laterally divergent wedge-shaped structure below the opening to distribute the fertilizer in two laterally spaced streams in the seed bed.

32. In an implement of the class described, the combination of fertilizer distributing means comprising a discharge duct having a valve opening at its lower end, and valve means for controlling the discharge of fertilizer through said opening, said valve means comprising a movable member having two walls seating against the opposite halves of said opening, said walls extending fore and aft beyond the ends of said opening and diverging laterally, whereby when said member is moved downwardly said walls present a laterally divergent wedge-shaped structure below the opening and fore and aft thereof to thereby distribute substantially the entire bulk of the fertilizer in two laterally spaced streams in the seed bed.

CHARLES H. WHITE.

CERTIFICATE OF CORRECTION.

Patent No. 2,023,655. December 10, 1935.

CHARLES H. WHITE.

It is hereby certified that error appears in the printed specification of the above numbered patent requiring correction as follows: Page 5, first column, line 4, claim 24, after "including" insert the words a pair of plate; and that the said Letters Patent should be read with this correction therein that the same may conform to the record of the case in the Patent Office.

Signed and sealed this 21st day of January, A. D. 1936.

(Seal)

Leslie Frazer
Acting Commissioner of Patents.